May 25, 1971     J. E. EICHENLAUB     3,580,795
APPARATUS FOR WELDING HEAT SEALABLE SHEET MATERIAL
Filed Dec. 1, 1969     5 Sheets-Sheet 2
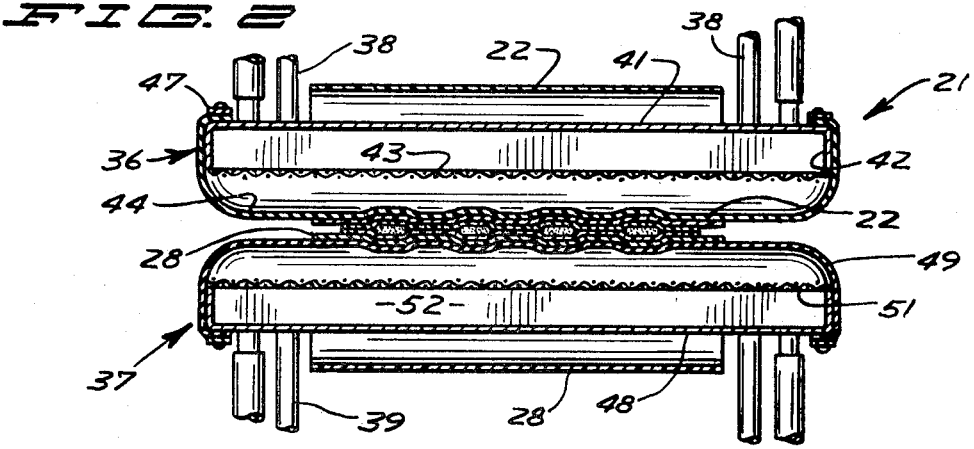
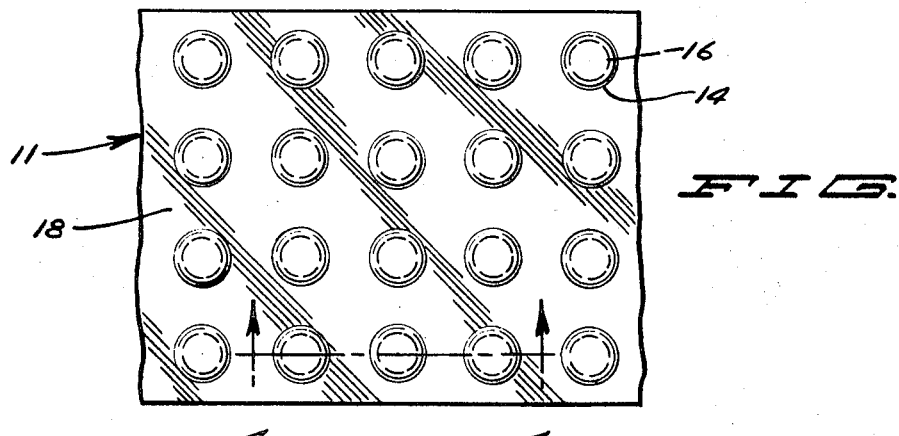
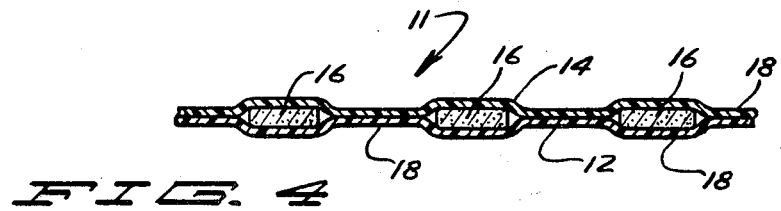
INVENTOR.
JOHN E. EICHENLAUB
BY
*Burd Braddock & Bartz*
ATTORNEYS May 25, 1971 J. E. EICHENLAUB 3,580,795
APPARATUS FOR WELDING HEAT SEALABLE SHEET MATERIAL
Filed Dec. 1, 1969 5 Sheets-Sheet 3
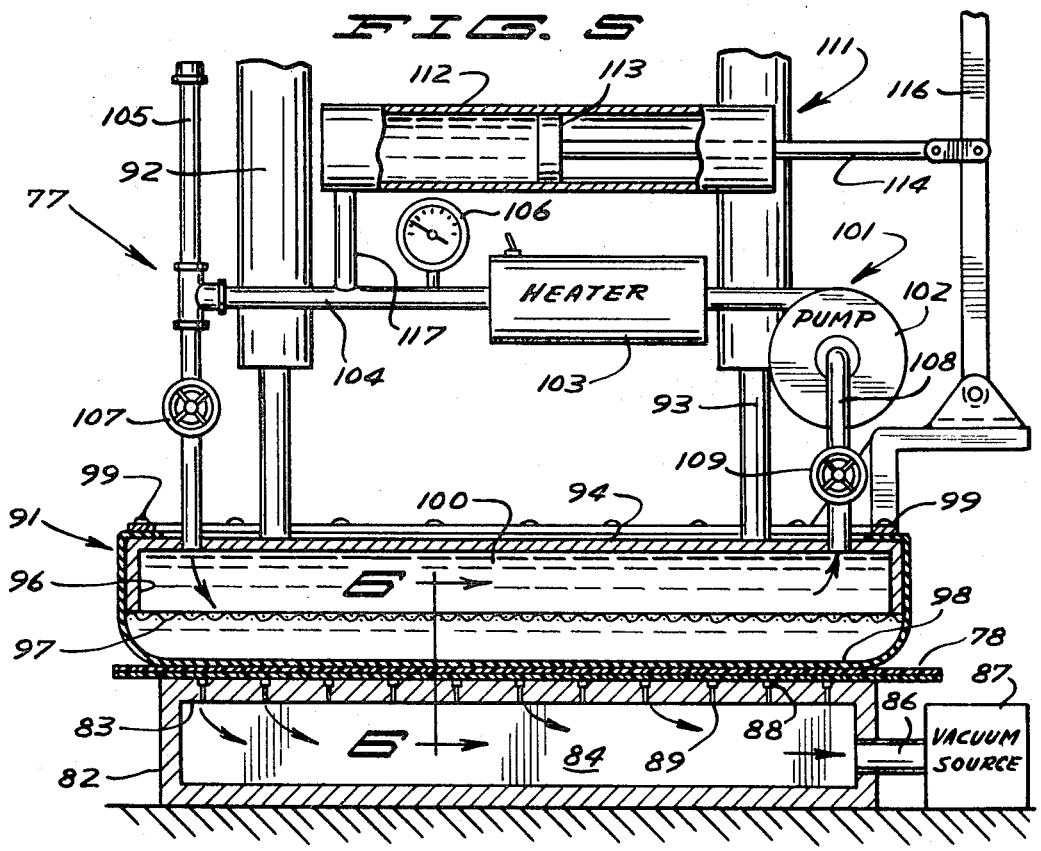
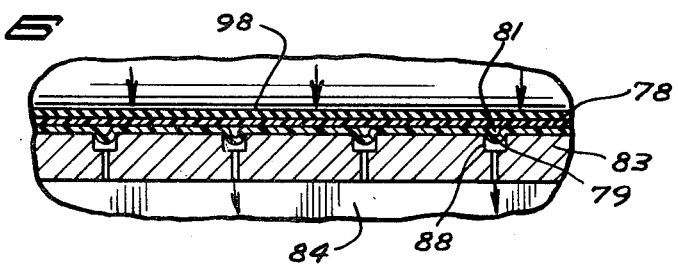
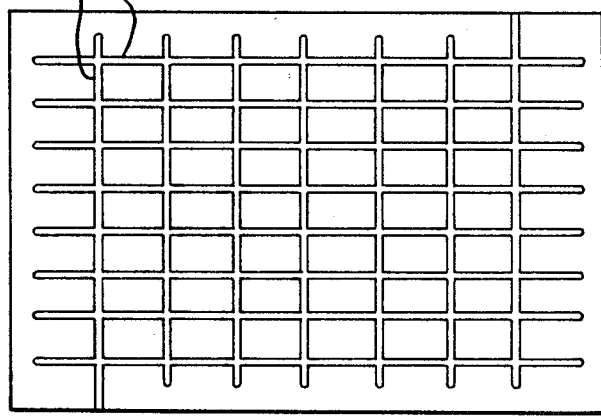
INVENTOR.
JOHN E. EICHENLAUB
BY
Burd Braddock & Bartz
ATTORNEYS

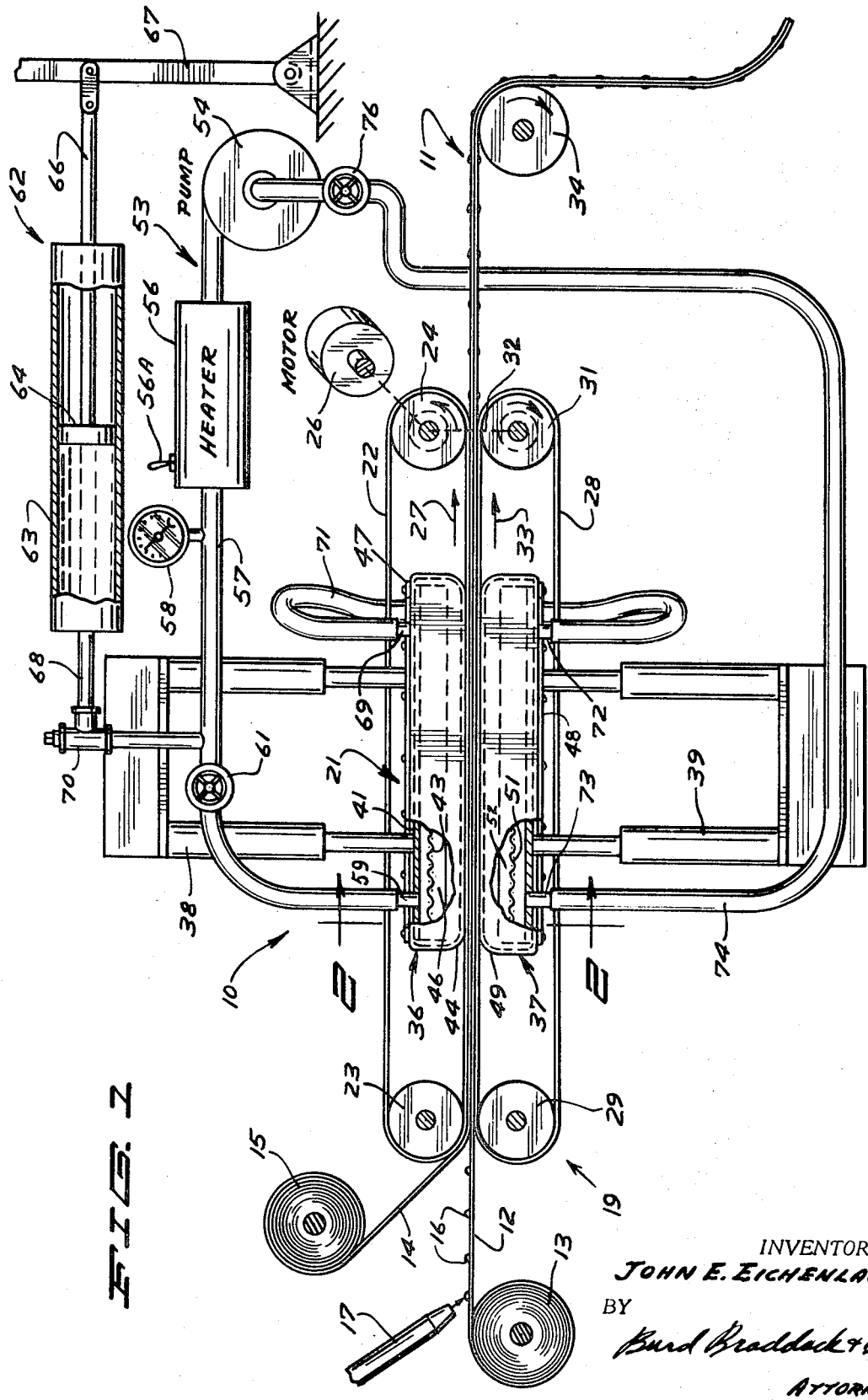

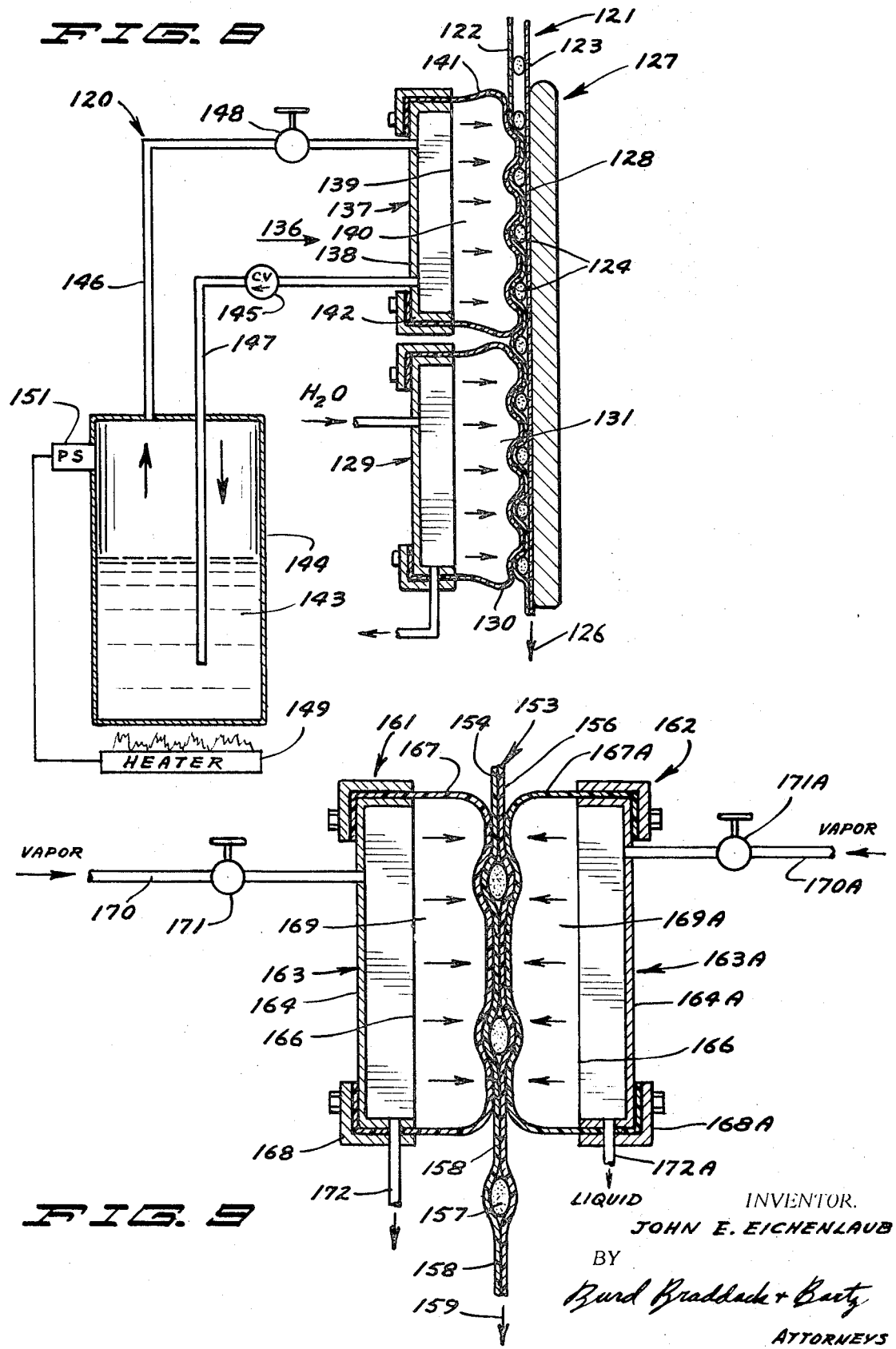

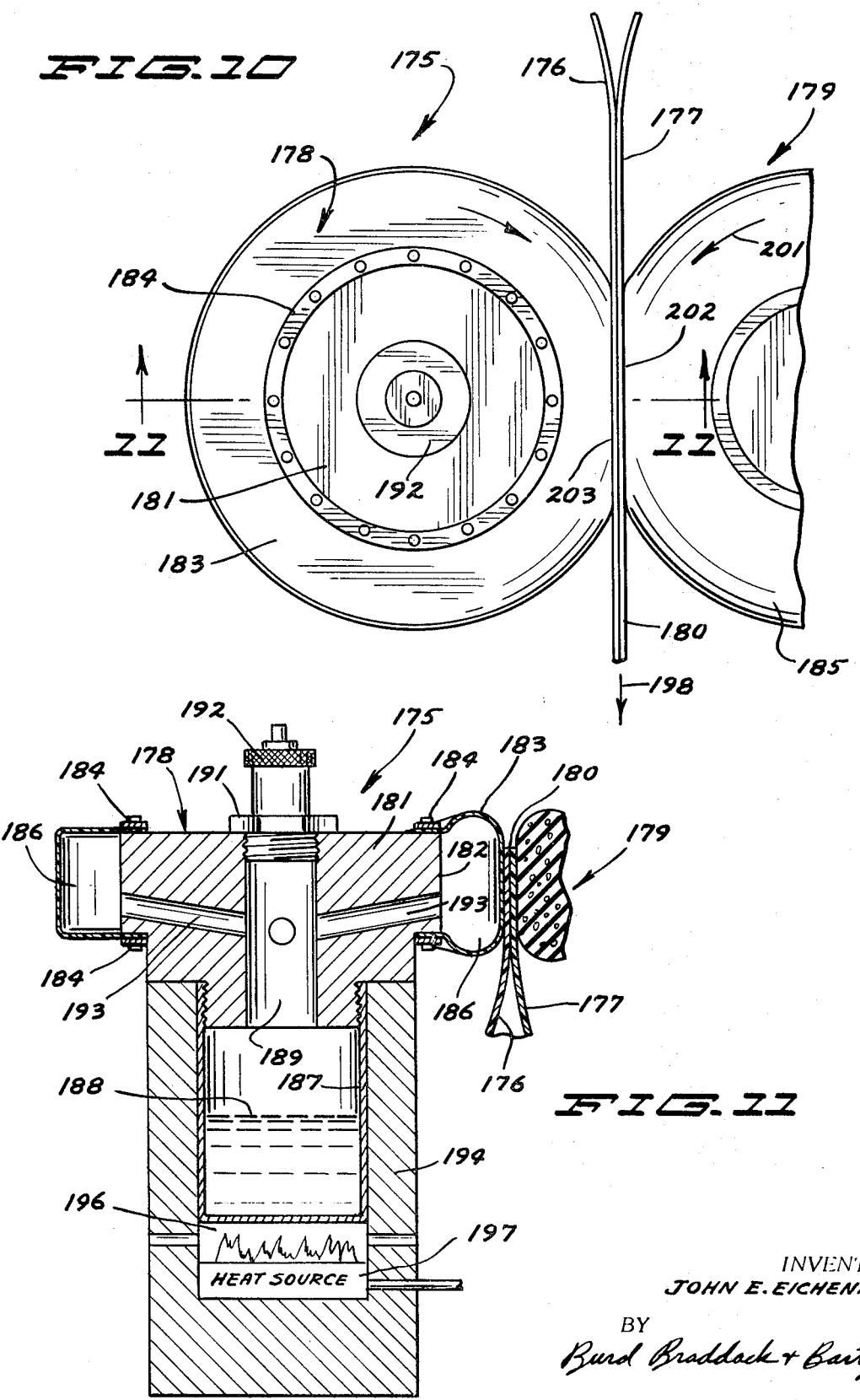

United States Patent Office 3,580,795
Patented May 25, 1971

3,580,795
APPARATUS FOR WELDING HEAT SEALABLE
SHEET MATERIAL
John E. Eichenlaub, 9321 Franklin Ave. W.,
Minneapolis, Minn. 55426
Continuation-in-part of application Ser. No. 584,564,
Oct. 5, 1966. This application Dec. 1, 1969, Ser.
No. 881,250
Int. Cl. B30b 15/34; B32b 31/20
U.S. Cl. 156—583                             24 Claims

ABSTRACT OF THE DISCLOSURE

An apparatus for welding heat sealable sheet material with heated fluid moving through a platen having a chamber. The chamber is closed with a flexible, nonelastic, thin cover having a surface area exposed to the chamber that is larger than the transverse area of the chamber, whereby the cover is moved by the pressure of the fluid in the chamber without elongating or deforming the cover to transmit force and heat to a surface of the sheet material. The cover is urged toward the sheet material by the heated fluid under pressure which transmits both heat and pressure to the sheet material to weld the material. The platen may be provided with fluid in a vapor phase to provide the platen with totally uniform pressure on the cover which adjusts to the irregularities on the surface opposing the cover. The vapor also maintains, through condensation of the vapor, a uniform surface temperature on the cover. The condensed liquid is returned from the chamber back to a vapor generating source.

CROSS REFERENCE TO RELATED APPLICATION

This application is a continuation-in-part of copending U.S. application Ser. No. 584,564, filed Oct. 5, 1966.

BACKGROUND OF INVENTION

Heat sealing devices have been developed with flexible body structures which can be inflated by heating liquids to bond together heat sealable materials. The flexible body structures used in these devices are resilient tubular members made of materials, as neoprene or other natural or synthetic rubbers. Examples of these devices are shown in U.S. Pats. No. 2,466,735 and No. 2,646,150. Presses have been provided with heads having a chamber closed with an elastic member. Heated liquid under pressure is located in the chamber. In use, the elastic member conforms to the shape or form of the surface to which it is applied. An example of this type of press is shown in U.S. Pat. No. 2,524,932. This elastic member has the same area as the fluid chamber and is made of elastic and resilient material which stretches and deforms when subjected to pressure. When the liquid pressure is released, the elastic member springs back to its initial size and shape.

SUMMARY OF INVENTION

Briefly described, the heat sealing apparatus of this invention has a support means providing a surface for receiving sheets of heat sealable material. The sheets of heat sealable material are welded or fused together by keeping a flexible, nonelastic cover subjected to heated fluid in constant pressure relationship with the heat sealable sheet members. A platen has a chamber closed with the thin, flexible, nonelastic cover which when pressed forward is in surface engagement with one of the sheet members. In some applications, an intervening flexible slip sheet can be interposed between the sheet members and the cover. A fluid circuit means distributes a supply of fluid through the chamber in the platen. This circuit means can have a pump for circulating the fluid through the platen chamber, a heater for increasing the temperature of the fluid and control means for sensing the temperature of the fluid in the system as well as regulating the pressure of the fluid. A cylinder means can be used to vary the pressure of the fluid in the system.

Fluid can be supplied to the platen chamber as a gas or vapor under pressure. Vapor condenses in the chamber on transfer of heat through the cover to the sheet members. The hot vapor in the chamber has considerable latent or potential heat. The vapor condenses as heat is transferred to the heat sealable material and anvil or support with little loss in temperature in the cover. Different sealing temperatures can be achieved by the use of a liquid having a boiling point just below the sealing temperature of the sheet material and regulating the pressure of the liquid. The pressure of liquid changes its boiling point. Also, sealing temperatures can be altered with the use of different fluids. Some fluids can have a boiling point above the temperature sealing point of the sheet material. The sheet material can be cooled to set the seal by injecting a cooling fluid into the chamber or moving the sheet material under an adjacent cooler platen.

The cover of the platen, being nonelastic and flexible, is urged by the pressure of the fluid in the chamber toward the sheet members positioned on the support forcing the sheet members into contact with each other. The heat of the fluid in the platen is readily and uniformly transferred through the thin cover. The temperature of the fluid can be accurately regulated and is relatively uniform across the entire surface of the cover. The pressure of the fluid transmits itself uniformly through the cover within its range of flexibility. The combination of heat and pressure transmitted from the fluid through the cover effectively heat seals or welds the sheet members together. The cover can be retracted to a withdrawn position by moving fluid from the platen to an expansion chamber or reservoir. The reservoir also compensates for volume changes due to vaporization and fluid loss. In the liquid-vapor system, cutting off the supply of vapor to the chamber and allowing the vapor to cool will reduce the volume of the chamber and thus retract the flexible nonelastic cover. This permits removal of the welded sheet and insertion of new sheet members under the cover of the platen. The support means of the apparatus can be a second platen having a thin, flexible cover facing the cover of the first platen. The support means may be a rigid surface which moves transversely beneath the platen with a slip sheet moving at the same rate of speed between the platen cover and the heat sealable sheet material. This permits continuous, rather than intermittent, processing of material.

IN THE DRAWINGS

FIG. 1 is a diagrammatic view of the apparatus for continuously encapsulating articles between heat sealable sheet members;

FIG. 2 is an enlarged sectional view taken along the line 2—2 of FIG. 1;

FIG. 3 is a plan view of the sheet members encapsulating articles;

FIG. 4 is an enlarged sectional view taken along the line 4—4 of FIG. 3;

FIG. 5 is a diagrammatic view of a modified apparatus for forming channels in sheet material;

FIG. 6 is an enlarged sectional view taken along the line 6—6 of FIG. 5;

FIG. 7 is a plan view of welded sheet members formed with material receiving channels;

FIG. 8 is a diagrammatic view of a liquid-vapor sheet welding apparatus of the invention;

FIG. 9 is a diagrammatic view of a modified liquid-vapor sheet welding apparatus;

FIG. 10 is a top plan view of a further modified liquid-vapor sheet welding apparatus of the invention; and FIG. 11 is a sectional view taken along the line 11—11 of FIG. 10.

Referring to FIG. 1 of the drawings, there is shown the sheet material welding apparatus of this invention, indicated generally at 10, illustrating the operative steps of continuously manufacturing an article carrying tape 11. Tape 11 initially comprises a bottom sheet 12 which unrolls from a supply roll 13 and is joined to a top sheet 14 which moves from a supply roll 15. A plurality of articles, material, or like separated elements are deposited on the bottom sheet 12 by a dispenser unit 17 before the sheet moves into apparatus 10. The apparatus 10 places top sheet 14 in superimposed relation over the bottom sheet 12 covering articles 16. Shown in FIGS. 3 and 4, tape 11 has welded heat sealed portions 18 which secure bottom sheet 12 to top sheet 14 confining or encapsulating article 16 between the sheets. The apparatus 10 can be used to continuously heat seal a plurality of sheets together. The sheet may be heat sealable plastic material or material carrying heat sealing material.

Apparatus 10 comprises a conveyor 19 operable to hold the top sheet 14 in alignment with bottom sheet 12. In use, the conveyor 19 moves the superimposed sheets through a combined heat and pressure applying unit, indicated generally at 21. Unit 21 simultaneously applies heat and pressure to the sheet members to press the members together and elevate the temperature to a point where the superimposed sheet members are permanently joined or welded to each other.

Conveyor 19 comprises an upper flat belt 22 trained about longitudinally spaced rollers 23 and 24. A motor 26 is drivably connected to roller 24 to move belt 22 around the rollers. The bottom run of the belt moves in the direction of arrow 27. A lower flat belt 28, located below and in alignment with upper belt 22, is trained about rollers 29 and 31 located below and in parallel alignment with upper rollers 23 and 24, respectively. Belts 22 and 28 are made of sufficiently thin, flexible, nonelastic and heat conductive material to readily transmit heat and pressure from the fluid within the platen to the sheet members. Belts 22 and 28 can be plastic films less than 10 mils in thickness. A drive 32, as a twisted belt, connects roller 24 with roller 31 so that the upper run of belt 28, facing the lower run of the upper belt 22, moves in the direction of arrow 33 at approximately the same speed. As welded tape 11 leaves conveyor 19, it passes over idler roller 34 and is deposited in a storage location.

Combined heat and pressure applying unit 21 comprises upper and lower platens, indicated generally at 36 and 37. Platens 36 and 37 cooperate to apply pressure and heat of a fluid medium to the top and bottom runs of belts 22 and 28 to squeeze and heat sheet materials 12 and 14 moved by conveyor 19 between belts 22 and 28. Supports 38 and 39 hold platens 36 and 37 adjacent the facing runs of belts 22 and 28. The platens 36 and 37 are identical in structure and function. The following description is limited to platen 36.

As shown in FIG. 2, platen 36 has a pan-shaped flat rectangular plate 41 secured to support 38. The sides and ends of plate 41 are turned downwardly and form side flanges 42 giving the plate the shape of an inverted pan. The open side of plate 41 faces the platen 37. A screen 43, secured to the side flanges, is located between plate 41 and a thin, flexible, nonelastic cover or membrane 44. Plate 41 and cover 44 form a chamber 46 divided by screen 43. Cover 44 has a general cup shape or bag shape with a flat surface located adjacent screen 43 and sides which extend upwardly adjacent flanges 42. Fastening members 47, as plates and bolts, secure the cover 44 to the edges of plate 41. Cover 44 is a thin (1 to 10 mils in thickness), nonelastic, pliable, heat resistant, single layer plastic membrane which is impervious to gas and liquid fluids. The cover material does not stretch or deform when subjected to heat and pressure. Cover 44 conducts heat freely because it is a thin film located in close proximity with the sheet material. The outer surface of the membrane is smooth and slippery. There is a low coefficient of friction between the membrane and the conveyor belt being heat sealed together so that the belt can be moved relative to the membrane during the time the belt is forced against the sheets. Examples of suitable cover materials are nonmetallic composite films, as polyimide Kapton, having a two mil thickness, and Armalon, a glass fiber reinforced saturated fluorocarbon film or a thin metal sheet, as aluminum foil.

Platen 37 has a pan-shaped plate 48 enclosed with a nonelastic, flexible cover 49. Screen 51 separates chamber 52 formed by plate 48 and cover 49. Platen 37, being located below upper run of belt 28 carrying the sheet material, functions as a support in addition to applying heat to the sheet material.

Returning to FIG. 1, the fluid circuit, indicated generally at 53, supplies platens 36 and 37 with heated fluid under pressure to expand the platens forcing the heat sealable members into engagement with each other and at the same time subjecting the sheet members to heat to perform the heat seal operation. The fluid in circuit 53 is a liquid, as a silicone fluid, i.e., G.E. Silicone Fluid S.F.–96. Circuit 53 has a pump 54, as a gear, vane or any suitable type of pump, operable to constantly circulate the fluid in the system. Located adjacent the output line of the pump is a heater 56 for raising the temperature of the fluid. The heater 56 can take the form of submerged electrical cartridges having a control switch 56A to provide control of the temperature of the fluid. A line or pipe 57, connected to the output of the heater and to connector 59 on one side of plate 41, carries the fluid from the heater into the chamber 46 of platen 36. A temperature gauge 58 mounted on pipe 57 senses the temperature of the fluid being delivered to platen 36. Line or pipe 57 also has a valve 61 adjustable to regulate the rate of flow of fluid in pipe 57.

A pressure applying means shown as a cylinder unit, indicated generally at 62, is used to vary the pressure of the fluid delivered to platen 36. Cylinder unit 62 comprises an elongated cylinder 63 slidably accommodating a piston 64 secured to a piston rod 66. A lever 67, connected to the outer end of the rod, is manually movable to move the piston 64 relative to cylinder 63 forming an expandable and contractible chamber for changing the pressure of the fluid in the system. Line 68 connects cylinder 63 to pipe 57 upstream from valve 61. A plugged inlet 70 is provided in line 68 for filling the fluid system.

Fluid delivered to platen 36 flows through the chamber 46 to a discharge coupling 69 connected to a line 71 extended around belts 22 and 28 to an inlet coupling 72 on the lower platen 37. Fluid is discharged through coupling 72 into chamber 52 of the platen 37. The fluid flows through chamber 52 to a coupling 73 located on the opposite side of plate 48. A line 74 connects coupling 73 with an inlet of pump 54. A valve 76, interposed in line 74, regulates the amount of fluid drawn into pump 54. Screens 43 and 51 in the platen prevent the flexible covers 44 and 49, respectively, from collapsing and provide for a substantially even flow of fluid through the platen chambers.

In operation, apparatus 10 is a continuously operating process of packaging a plurality of articles 16 between sheet members 12 and 14. The sheet members 12 and 14 are initially placed between the belts 22 and 28 before the apparatus is started. Operation of motor 26 drives the belts to continuously pull bottom sheet 12 and top sheet 14 through apparatus 10 and between the flexible covers of platens 36 and 37. The dispenser unit 17 operates to deposit discrete amounts of material in selected positions on bottom sheet 12. Articles 16 may be any object which can be encased between sheets of heat sealable material.

Operation of pump 54 continuously circulates fluid through heater 56 and chambers 46 and 52 of the platens 36 and 37, respectively. The temperature of the fluid and the amount or rate of flow through the platens is regulated to keep the temperature at a predetermined value according to the heat sealing requirements of the sheet material. Cylinder unit 62, operated on movement of lever 67, will increase the pressure of the fluid in the circuit, thereby expanding the flexible covers 44 and 49 forcing the adjacent runs of belts 22 and 28 toward each other with the result that the bottom sheet member and the top sheet member are held in surface engagement with each other. Belts 22 and 28 and covers 44 and 49 have sufficient flexibility to permit the articles to deform these members without applying excessive pressure on the articles. Fluid flowing through platen chambers 46 and 52 has sufficient temperature to affect heat sealing of the sheet members forced together by the pressure of the fluid so that engaged portions between the articles are joined together. The belts 22 and 28 slide over the cover surfaces and transmit a uniform pressure over a substantial area of the sheet members. The screens 43 and 51 in the platens function as baffles to distribute the flow of fluid through the chambers, thereby providing uniform temperature over the entire surface. In addition, the screens prevent portions of the covers from being drawn toward the fluid exit opening in couplings 69 and 73.

The pressure of fluid in the system may be varied by the use of the cylinder unit 62. The movement of the lever 67 to the left, as shown in FIG. 1, reduces the fluid pressure to a minimum and draws fluid from chambers 46 and 52 wherein the covers 44 and 49 move away from the adjacent runs of belts 22 and 28 to relieve all the pressure on sheet members 12 and 14. This permits a quick threading of the apparatus with new sheet material to start a new run. In addition, the pressure may be varied according to the requirements of the article and the sheet material used to enclose the article.

Referring to FIG. 5, there is shown a modified apparatus, indicated generally at 77, for heat sealing members into a welded sheet 78 having a plurality of connected passageways. One sheet member has grooves or recess portions 79 forming passageways 81 with the other sheet member. The level portions of the sheet members form a continuous welded sheet having interconnected passageways 81 for receiving materials, as liquids, semi-solids and gases. An example of a welded sheet member 78 is shown in FIG. 7, wherein the sheet member has interconnected passageways 81 open to the edges to receive pressure monitoring equipment (not shown).

Referring to FIG. 5, apparatus 77 has a flat, box-like support 82 having a flat top wall 83 forming with the remainder of the support a chamber 84 open to a line 86 connected to a source of vacuum 87. Wall 83 is made of a heat insulative material. The top surface of support 82 has a plurality of downwardly projected grooves 88 in a rectangular coordinate pattern, as indicated by the coordinate pattern of passageways 81 of sheet 78, shown in FIG. 7. Each groove is connected with a plurality of passages 89 to the chamber 84. On application of a vacuum pressure to chamber 84, sheet material lying on the top surface of top wall 83 is drawn into the grooves 88 while being heated by the platen forming the passageways 81. At least one groove is open to outside air so that air flows into the grooves during the formation of the grooves. The top wall 83 can have other recess shapes in lieu of grooves 88 to change the pattern in the final heat sealed sheets.

The heat sealable sheet members forming the welded sheet 78 are secured together with the use of a platen, indicated generally at 91, which applies with heated fluid under pressure and a flexible cover uniform pressure and heat to the sheet members to perfect a heat seal operation. The cover 98 is made from material chosen to be flexible enough to conform to minor irregularities in the support surface but inflexible enough not to drive the upper sheet down into the bottom sheet grooves. Platen 91 is carried on a pair of supports 92 and 93 located above the top wall 83. The details of platen 91 are identical with the structure of platens 36 and 37 and include a plate 94 having downwardly projected side flanges 96 to form a pan-shaped member. A screen 97 extends across the pan and is secured to the flanges 96. A nonelastic and flexible cover 98, located over screen 97 and about side flanges 96, is secured at its upper edge by fastening members 99 to the edges of the plate 94. The plate 94 and cover 98 define a chamber 100 which is divided by screen 97. Cover 98 can be made of the same material as cover 44.

A fluid circuit, indicated generally at 101, is used to circulate heated fluid through chamber 100 and apply pressure on the cover 98 urging the bottom portion of the cover toward support top wall 83. Fluid circuit 101 comprises a pump 102 which delivers fluid under pressure to a heater 103. A line or pipe 104, connected to the discharge opening of heater 103, delivers the fluid to one side of platen 91. Line 104 has a plugged inlet 105, a temperature gauge 106 and a valve 107 adjustable to control the rate of flow of fluid into chamber 100. The opposite side of plate 94 is connected to a return line 108 leading to the inlet of pump 102. A valve 109, interposed in line 108, controls the flow of fluid to pump 102.

The pressure of the fluid in the fluid circuit is controlled by a pressure applying means, as a cylinder unit, indicated generally at 111. Cylinder unit 111 comprises an elongated cylinder 112 accommodating a reciprocating piston 113 connected to a piston rod 114. The free end or outer end of rod 114 is connected to a pivoted lever 116 which is operable to change the location of the piston relative to the cylinder, thereby either increasing or decreasing the pressure of the fluid in the fluid circuit 111. The line 117 connects cylinder 112 to line 104 upstream of valve 107.

In operation, apparatus 77 is a piece-by-piece or batch operation, in that platen 91, or at least cover 98, must be retracted for each welded sheet member produced. Initially, the superimposed sheets of heat sealable material are placed on the top surface of top wall 83. The platen cover 98 is extended and the fluid heats the sheet members. The channels 79 are placed in the bottom sheet of the superimposed sheets by applying a source of vacuum to chamber 84. The vacuum pressure draws the bottom sheet material into the grooves 88 forming the passageways 81 after it reaches formable temperature. The pattern of the passageways is determined by the pattern of the grooves or recesses 88 in the top wall 83.

To weld the sheets together, the fluid circuit is used to initially increase the pressure of the fluid in the circuit, whereby the flexible cover 98 is moved into pressure contact with the top of the top sheet. On operation of the pump and heater, heated fluid is continuously moved through chamber 100 at a temperature which is sufficient to affect a heat sealing of the sheet members to form the welded sheet member. Vacuum force may be continued to be applied to the chamber 84 at a low pressure, thereby holding the channel in the grooves 88 to form uninterrupted passageways 81.

After the heat sealing operation is completed, pressure of the fluid circuit is released by moving lever 116 to carry piston 113 in a reverse direction to relieve the fluid pressure. This withdraws cover 98 from the top surface of welded sheet member 78, whereby it may be readily removed from the apparatus.

Apparatus 77 can also be used to form temperature sensitive material, as thermoplastic sheet material, into a desired shape. A single sheet of material can be placed on the top surface of top wall 83. The sheet is heated to a flowable state by expanding the flexible cover to transmit heat and pressure to the sheet material. With the sheet material in a flowable state, it is deformed into grooves 88 by applying a source of vacuum to chamber 84. The vacuum pressure draws portions of the sheet material into grooves 88 forming channels 79. After the forming operation is completed, the flexible cover is removed from the sheet material.

Shapes other than channels can be formed in the sheet material. The top wall 83 may have pockets, recesses, projections or ridges which determine the final shape of the sheet material.

Apparatus 77 may be modified to provide continuous operation by moving a number of supports, as support 82, under platen 91. The supports can be mounted on a moving conveyor or drum. A slip sheet can be interposed between the sheet members on the moving supports and cover 98 to insure smooth movement of the sheet members under the platen.

Referring to FIG. 8, there is shown a liquid-vapor sheet welding apparatus, indicated generally at 120, for forming a laminated tape 121 carrying a plurality of spaced articles 124. The tape 121 comprises a first heat sealable plastic sheet 122 and a second heat sealable plastic sheet 123. The articles 124 are located in enclosed pockets between the sheets 122 and 123. The plastic sheets 122 and 123 are made of heat sealable material which can be stored on separate supply rolls. Apparatus 120 is operable to continuously heat seal the plastic sheets as the sheets move in the direction of arrow 126 through the apparatus. The apparatus 120 is usable to form a continuous seam or laminated tape with pockets for enclosing articles. A thin slip sheet (not shown) can be used between sheet 122 and the platen covers 130 and 141 to insure continuous movement of the sheets 122 and 123.

Apparatus 120 comprises a fixed support or anvil 127 having a substantially flat surface 128 adapted to be engaged by the sheet 123. The support can have grooves or recesses in surface 128 open to chamber 129. A vacuum source can be coupled to the recesses, as shown in FIG. 5.

Located adjacent the support 127 is a combined heat and pressure applying unit, indicated generally at 136, operable to hold the sheets 122 and 123 in face-to-face relation and transmit sufficient heat to the sheets to heat seal the sheets together. The unit 136 comprises a platen 137 having a generally pan-shaped member 138 with an open side 139 facing the support 127. A large flexible cover or membrane 141 closes the open side 139 of the pan-shaped member 138. Attachment structure 142 is used to connect the peripheral portions of the cover 141 to the pan-shaped member 138 to define an enclosed chamber 140 for the heated fluid under pressure. Cover 141 has a general bag or cup shape with a flat bottom facing the surface 128. The bottom of the cover 141 is spaced outwardly from the open side 139 of the pan-shaped member 138. The side walls, or peripheral portions of the cover, are generally parallel with the side flanges of the pan-shaped member 138.

The cover 141 has an inside surface area exposed to the chamber 140 which is larger than the transverse or open area of the opening 139. In other words, the cover 141 is bigger than the open end of the pan-shaped member 138, whereby the cover moves away from the pan when fluid under pressure is introduced into the chamber 140. The cover is a flexible, nonelastic, single sheet member made from nonmetallic composite plastic material, as polyimide Kapton, the glass fiber reinforced fluorocarbon Armalon, and like materials. This material does not stretch or deform when subjected to pressure. The surface of the cover has a low friction coefficient so that in some applications the tape 121 is free to slide over the face of the cover 141. In other applications, a thin slip sheet is interposed between the cover and the plastic sheets. The pressure and the heat of the fluid in the chamber 140 uniformly moves the cover 141 into surface engagement with the plastic sheet 122, whereby an effective transfer of heat from the fluid to the plastic sheets 122 and 123 is achieved to weld the sheets together. The movement of the tape 121, relative to the cover, does not deform, stretch, or otherwise change the uniform pressure characteristics and uniform heat transfer characteristics of the cover 141 so that the sheets 122 and 123 will be continuously welded together as the tape is moved through the sheet welding apparatus 120. The platen 137 can be used in batch sealing of heat sealable material. The cover 141 can be retracted from the support 127 by cutting off the vapor to chamber 140 and allowing the vapor to cool. Cooling air under pressure can be moved through the chamber to provide for rapid cooling of the sheet material while it remains under pressure to set the seal. After the seal is set, the air is released from chamber 140 to retract cover 141.

The fluid is supplied to the chamber 140 as a vapor or gas phase fluid at a regulated pressure. The chamber 140 acts as a condensation chamber, whereby some of the vapor condenses to the liquid phase. The transition of the fluid from a vapor to a liquid provides effective and efficient transfer of heat through the thin cover 141 to the sheet members 122 and 123. This transition or change in phase of the fluid maintains a very uniform temperature in the chamber 140. The liquid is returned to a reservoir or heat source. The liquid 143 is stored in a tank 144. The top of tank 144 is connected with a line 146 to the platen 137 to carry vapor to the chamber 140. A return line 147, having a check valve 145, connects the bottom of the platen with the tank 144 to return the condensed liquid to the tank. The operating temperature of the liquid-vapor apparatus is determined by the type or constitution of the fluid and the pressure in the system. The system can operate at a relatively low pressure; for example, one-half to one pound per square inch. The pressure may vary with the size and shape of the platen and thickness of the sheet material. The low pressure fluid in the platen allows smooth movement and slippage between the cover or slip sheet and the sheet material and prevents beading of the edges of the sheets and weak thin areas in the sheets. The pressure of the vapor in the chamber 140 is regulated with a pressure control valve 148 located in line 146. The pressure control valve 148 can be an automatic pressure regulating valve which can be set for operation at a predetermined pressure. The vapor source can be connected to the platen 137 with a large line or pipe which allows both vapor and liquid flow between the vapor source and platen. The vapor has high potential heat so that considerable heat loss can result before there is a reduction in temperature in chamber 140. Condensation of the vapor results when there is heat transfer through the thin cover. The heat of condensation instantly compensates for the heat loss.

The liquid 143 in tank 144 is heated with an outside heat source, as a heater 149, positioned adjacent the bottom of the tank. The heater is regulated with a pressure switch 151 connected to the heater control through a line 152. The pressure switch may be adjustable to control the heating of the liquid 143 and pressure of vapor in the tank 144.

Located adjacent platen 141 is a cooling platen 129 having a flexible, nonelastic cover 130 over a cooling chamber 131. Cooling fluid, as water or air, is continuously supplied to the chamber to hold the cover in engagement at a uniform pressure with the tape 121. The platen 129 cools the tape under pressure to insure that the heat seal achieved previously will be maintained until the tape 121 cools sufficiently to set. The tape 121 can be cooled by lowering the temperature in platen 137. This can be done by cutting off the supply of heated vapor to chamber 140 and allowing the vapor in chamber 140 to cool. The seal will set before the cooling vapor relieves the pressure on the tape. Outside cooling fluid, as air, can be introduced into chamber 140 to cool cover 141 while maintaining pressure on the seal when the temperature differential between sealing pressure and release pressure is not sufficient to set the seal.

Referring to FIG. 9, there is shown a modification of the liquid-vapor heat sealing apparatus for forming a tape, indicated generally at 153. Tape 153 comprises plastic sheets 154 and 156 heat sealed together to confine articles 157. Spaced portions 158 of the tape 153 are welded together in a continuous operation as the tape moves in the direction of the arrow 159 through the heat sealing apparatus.

Located on opposite sides of the tape 153 are combined heat and pressure applying units 161 and 162. The units are identical in structure. Parts of units 162, which correspond with parts of unit 161, are identified with the same reference number having the suffix A.

Unit 161 has a platen, indicated generally at 163, having a generally pan-shaped member 164 with an open side 166 facing the tape 153. A flexible, nonlastic, one sheet membrane or cover 167 encloses the open side 166 of the pan-shaped member 164. The cover 167 can be made of the same materials as covers 44 and 141. The membrane 167 has a general bag or cup shape and an inside surface area which is larger than the transverse raea of the open side of the pan-shaped member 164. The outer peripheral portions or sides of the cup-shaped cover 167 are folded over the pan-shaped member 164 and clamped to the cover with an attachment member 168 to form an enclosed chamber 169 for accommodating the heated fluid under pressure. The fluid is supplied to the chamber 169 in the form of a vapor or gas through a line 170 containing a pressure control valve 171. In the chamber 169, the vapor transfers its heat through the thin cover 167 to the heat sealable sheet members 164 and 166. The condensation or liquid from the vapor flows back to the heat source through an output line 172 connected to the bottom of the platen.

In use, the sheets 154 and 156 are superimposed on each other with the article located between the sheets. The sheets are then moved between the covers 167 and 167A. The application of heated fluid under pressure to the chambers 169 and 169A applies even heat and even pressure to opposite sides of the sheets to heat seal the sheets together. This heat sealing operation is continuous, as the sheet members are continuously moved between the covers 167 and 167A. The heated vapor under pressure is supplied to both of the chambers from a heat source. The heat source may be constructed according to the heat source tank 144 and heater 149, as shown in FIG. 8. Other heat sources can be used to convert the liquid fluid to a vapor which is supplied to the platen chambers 169 and 169A.

Referring to FIG. 10, there is shown a further modification of a liquid-vapor sealing apparatus, indicated generally at 175, for heat sealing superimposed plastic sheets 176 and 177. The apparatus 175 has a rotatable circular platen 178 engageable with a roller support 179. The platen 178 has a hub 181 having a cylindrical outer circumferential surface 182. An annular tire-shaped cover 183 is secured to the hub 181 with annular attaching members 184. The cover 183 has an inside surface area exposed to the outer peripheral surface 182 which is larger than the area of the surface, thereby forming an annular chamber 186 for accommodating heat sealing fluids. Cover 183 is a flexible, nonelastic single sheet member made from plastic material. The plastic material does not stretch or deform when subjected to heat and pressure. The plastic material can be a nonmetallic composite material, as a high quality, low void thin film similar to cover 141 shown in FIG. 8.

As shown in FIG. 11, a downwardly extended container 187 is secured to the lower side of the hub 181. Located in container 187 is a liquid 188, as water, which when heated will change to a vapor phase. The upper end of the container 187 can be threaded onto a downwardly directed extension of the hub 181. Hub 181 has a central upright passage 189 open to the inside of container 187. The upper end of passage 189 is closed with a plug 191 carrying a pressure release valve 192. Valve 192 is operable to maintain a predetermined pressure on the vapor in the platen. Valve 192 can be open to release all of the pressure in the platen. A plurality of lateral passages 193 in hub 181 connect the upright passage 189 with the chamber 186 so that the vapor from the liquid 188 can flow into the chamber 186. The passages 193 are open to the lower portion of the chamber 186 and are of a sufficient size so that any liquid can flow back into the container 187.

The hub 181 is rotatably mounted on an upright support 194 having an upright passage 196 for accommodating the container 187. Hub 181 rotates about an upright axis. Located in the bottom portion of the passage 196 is a heat source 197, as a gas burner or electric heater, for heating the bottom of the container 187. The heat source 197 can be regulated in response to the pressure in the platen with the use of a pressure control switch (not shown) similar to the pressure control switch 151 shown in FIG. 8.

The liquid-vapor sealing apparatus 175 is shown as forming a continuous seam 180 to weld the plastic sheets 176 and 177. The apparatus 175 can be used to heat seal plastic sheets around articles, as shown in FIG. 8. The continuous heat seal is formed by moving the plastic sheets 176 and 177 between the platen 178 and the roller support 179 in the direction of arrow 198. The platen 178 rotates in the direction of arrow 198, while the roller support 179 rotates in the direction of arrow 201. The roller support 179 has an annular resilient tire 185 positioned in pressure contact with the cover 183. Both the roller support tire 185 and the cover 183 are deformed into flat portions 202 and 203 so that a linear section of the plastic sheets 176 and 177 is subjected to substantially even pressure and heat which will continuously weld the plastic sheets 176 and 177 together. The cover 183, being a very thin film, conducts heat to the plastic sheets. The heat is readily available in chamber 186, as a heated vapor having considerable potential heat. Any loss of heat is added to the chamber by the condensation of the vapor with a minimum temperature drop.

An additional tape guiding sheet (not shown) can be interposed between the cover 183 and sheet 176. This guiding sheet can move in the circular direction of tire 185 to hold the tape 180, leaving cover 183 in tight engagement with the tire. Thus, the hot tape is under pressure while it cools to insure a seal. The guiding sheet can be a continuous band moving around cover 183.

This description and drawings are directed to the preferred embodiments of the heat sealing apparatus of this invention. It is intended that various omissions, substitutions, changes in dimensions and material may be made by those skilled in the art without departing from the invention. For example, a plurality of platens may be placed in line to sequentially subject the sheet members to several temperatures, whereby the sheet members may be heated to a forming temperature, then to a heat seal temperature and then cooled or quenched. This is accomplished by providing a separate fluid system for each of the platens.

The invention is defined in the following claims.

The embodiments of the invention in which an exclusive property or privilege is claimed are defined as follows:

1. An apparatus for welding heat sealable sheet material comprising: support means having a surface for receiving at least two sheets of heat sealable material, platen means positioned in a fixed relationship relative to said support means, said platen means having a chamber closed with a single, non-elastic, flexible membrane located adjacent said surface, said membrane having a surface area exposed to the chamber larger than the transverse area of the chamber, whereby the membrane moves away from the chamber wthout stretching when fluid under pressure is introduced into the chamber, fluid circuit means for distributing a supply of fluid through said chamber, means for heating the fluid, means for maintaining and varying the pressure of the fluid in the chamber to selectively move the membrane toward and away from the support means, said pressure maintaining means operable to maintain the pressure on the fluid, whereby the membrane is forced by the fluid under pressure toward the surface of the support means so that the heat in the fluid is transferred to the sheets to heat seal the sheets together.

2. The apparatus of claim 1 including: conveyor means for moving the sheets between the flexible membrane and the surface on the support.

3. The apparatus of claim 2 wherein: said conveyor means includes a pair of facing endless belts of thin, flexible sheet material.

4. The apparatus of claim 1 wherein: said support means comprises a second platen having a chamber closed with a single, nonelastic second flexible membrane facing the membrane of the first platen, said second membrane having a surface area exposed to the chamber larger than the transverse area of the chamber in the second platen, said fluid circuit means connected to the second platen, whereby fluid pressure within the chambers forces both membranes toward each other, thereby heating and pressing the sheets together.

5. The apparatus of claim 4 including: conveyor means comprising thin, flexible, nonelastic belts for moving the sheets between the flexible membranes of the platens.

6. The apparatus of claim 1 wherein: said platen means includes a screen means in the chamber.

7. The apparatus of claim 1 wherein: said fluid circuit means includes a pump for continuously circulating the fluid through the platen chamber.

8. The apparatus of claim 1 wherein: said surface of the support means has recessed portions, said support means including passage means connected to said recessed portions and a source of vacuum pressure coupled to said passage means, whereby portions of said sheet engaging said surface are drawn into said recessed portions.

9. The apparatus of claim 1 wherein: said membrane is a thin, nonelastic, pliable, plastic sheet member.

10. The apparatus of claim 9 wherein: the sheet member is plastic material less than 10 mils in thickness.

11. The apparatus of claim 1 wherein: said fluid circuit means has a fluid that is a liquid and when heated changes to a vapor, said vapor being supplied to the chamber where it can condense to a liquid to make up for heat lost from the chamber.

12. An apparatus for forming temperature sensitive sheet material comprising: support means having a surface for receiving at least one sheet of temperature sensitive material, said surface having associated means for deforming the sheet material, platen means positioned adjacent said support means, said platen means having a chamber, a single nonelastic, flexible membrane closing said chamber located adjacent said surface, said membrane having a surface area exposed to the chamber larger than the longitudinal area of the chamber, whereby the membrane moves away from the chamber without stretching when fluid under pressure is introduced into the chamber, fluid circulating means for distributing a supply of fluid through said chamber, said circulating means including means for heating and increasing the pressure of the fluid, whereby the flexible membrane transmits heat and pressure to the sheet material on the surface to form the sheet material to a shape determined by the means associated with the support surface.

13. The apparatus of claim 12 wherein: said associated means on the surface are recessed portions, said support means including passage means connected to said recessed portion and a source of vacuum pressure coupled to said passage means, whereby portions of said sheet material on said surface are drawn into said recessed portions.

14. The apparatus of claim 12 wherein: said fluid circuit means has a fluid that is a liquid and when heated changes to a vapor, said vapor being supplied to the chamber where it can condense to a liquid to make up for heat lost from the chamber.

15. In an apparatus for processing temperature sensitive material, a platen comprising: a hub mounted for rotation, a single nonelastic flexible annular cover secured to the hub and defining with the hub a chamber, said cover having a surface area exposed to the chamber larger than the transverse area of the chamber, whereby the cover moves away from the chamber when fluid under pressure is introduced into the chamber without deforming or stretching the cover, fluid circuit means for distributing a supply of fluid through said chamber, said circuit means including means for heating and increasing the pressure of the fluid, whereby the flexible, nonelastic cover is subjected to the heat and pressure of the fluid.

16. The apparatus of claim 15 including: a support for rotatably mounting said hub.

17. The apparatus of claim 15 including: means operable to maintain a predetermined pressure on the fluid in the chamber.

18. The apparatus of claim 15 wherein: said circuit means includes a container for storing fluid, and a support, said container located within said support and connected to said hub.

19. The apparatus of claim 15 wherein: said fluid circuit means has a fluid that is a liquid and when heated changes to a vapor, said vapor being supplied to the chamber where it can condense to a liquid to make up for heat lost from the chamber.

20. The apparatus of claim 15 wherein: said cover is an annular tire-shaped member secured to the hub.

21. The apparatus of claim 15 wherein: said fluid circuit means includes a container for storing the fluid attached to the hub and passage means connecting the chamber to the container and means for heating the fluid in the container.

22. The apparatus of claim 15 including: a second rotatable member adapted to engage the cover, and means for holding the temperature sensitive material in engagement with the second rotatable member after it leaves the cover.

23. An apparatus for welding heat sealable sheet material comprising: support means having a surface for receiving at least two sheets of heat sealable material, platen means positioned adjacent said support means, said platen means having a chamber closed with a thin flexible nonelastic cover located adjacent said surface, said cover having a surface area exposed to the chamber larger than the transverse area of the chamber, whereby the cover moves away from the chamber without stretching when fluid under pressure is introduced into the chamber, fluid circuit means for distributing a supply of fluid under pressure through said chamber, said fluid circuit means including a fluid that is a liquid and when heated changes to a vapor, said vapor being supplied under pressure to the chamber where it can condense back to a liquid to make up for heat lost from the chamber, whereby the cover is forced by the vapor under pressure toward the surface on the support means so that both heat and pressure is transferred through the cover to the sheets between the cover and surface to heat seal the sheets together.

24. An apparatus for welding heat sealable sheet material comprising: support means having a surface for receiving heat sealable material, platen means positioned adjacent said support means, said platen means having a chamber closed with a thin cover located adjacent said surface, fluid circuit means for distributing a supply of fluid through said chamber, said fluid circuit means including a fluid that is a liquid and when heated changes to a vapor, said vapor being supplied to the chamber where it can condense back to a liquid to make up for heat loss from the chamber, whereby the temperature over the entire surface of the cover is maintained substantially uniform.

References Cited

UNITED STATES PATENTS

| | | | |
|---|---|---|---|
| 1,806,861 | 5/1931 | Owen | 156—583X |
| 2,459,295 | 1/1949 | Skoog | 156—382X |
| 2,524,932 | 10/1950 | Schulman | 156—583X |
| 2,621,704 | 12/1952 | Langer | 156—583X |
| 3,025,208 | 3/1962 | Geiger | 156—581X |

BENJAMIN A. BORCHELT, Primary Examiner

J. J. DEVITT, Assistant Examiner

U.S. Cl. X.R.

156—285